United States Patent [19]

Valente et al.

[11] 3,772,480

[45] Nov. 13, 1973

[54] SELF-TESTING SELECTION ARRANGEMENT FOR A COMMUNICATION SWITCHING SYSTEM

[75] Inventors: Angelo M. Valente, Schaumburg; Robert W. Wolff, Lombard, both of Ill.

[73] Assignee: GTE Automatic Electric Laboratories Incorporated, Northlake, Ill.

[22] Filed: Oct. 2, 1972

[21] Appl. No.: 293,986

[52] U.S. Cl. .......................................... 179/175.23
[51] Int. Cl. .......................................... H04m 3/24
[58] Field of Search ................. 179/175.21, 175.23, 179/175.25, 175.2 R, 18 E

[56] References Cited

UNITED STATES PATENTS

| | | | |
|---|---|---|---|
| 3,500,001 | 3/1970 | Lewen et al. | 179/175.21 |
| 3,413,421 | 11/1968 | Cochran et al. | 179/18 FH |

*Primary Examiner*—William C. Cooper
*Assistant Examiner*—Douglas W. Olms
*Attorney*—K. Mullerheim et al.

[57] ABSTRACT

A self-testing selection arrangement which may be employed in a communication switching system having a switching network responsive to marker-generated control signals supplied over a series of control connections, includes a sequence counter for controlling a connection selection apparatus, which in the preferred embodiment is a relay tree apparatus. During the selection of a control selection, the selection apparatus responds to the sequence counter for generating a signal indicative of a selected set of connections, and test circuits responsive to the signal to advance the counter, which in turn causes the selection apparatus to establish a selected one of the control connections. During a subsequent release of the selected established connection, the counter causes the selection apparatus to release the connection, and in response thereto, the counter is advanced. The signal indicative of the selected set is de-activated in response to the last-mentioned advancing of the counter, whereby during both the establishment of a connection and the releasing of it the counter is advanced only in response to the successful completion of each step of the operation and if any one step is not successfully completed due to malfunctioning of the equipment or for any other reason, the counter is not advanced and and a maintenance request for service is initiated.

11 Claims, 1 Drawing Figure

United States Patent [19]
Valente et al.
[11] 3,772,480
[45] Nov. 13, 1973
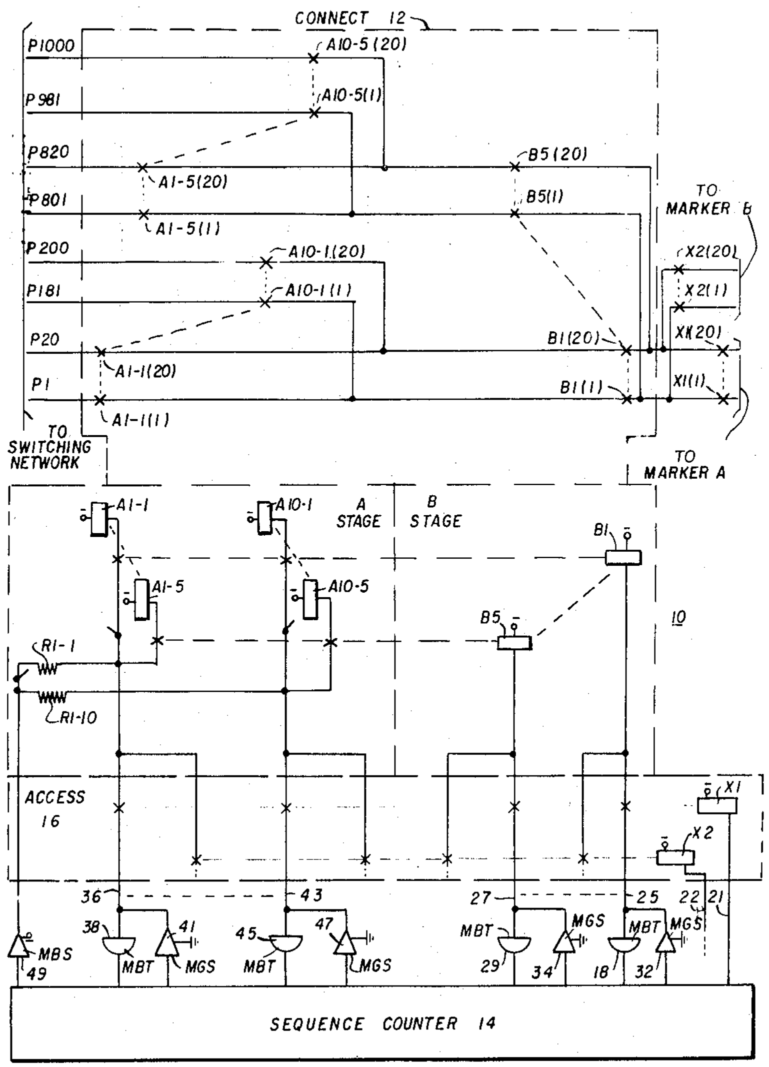

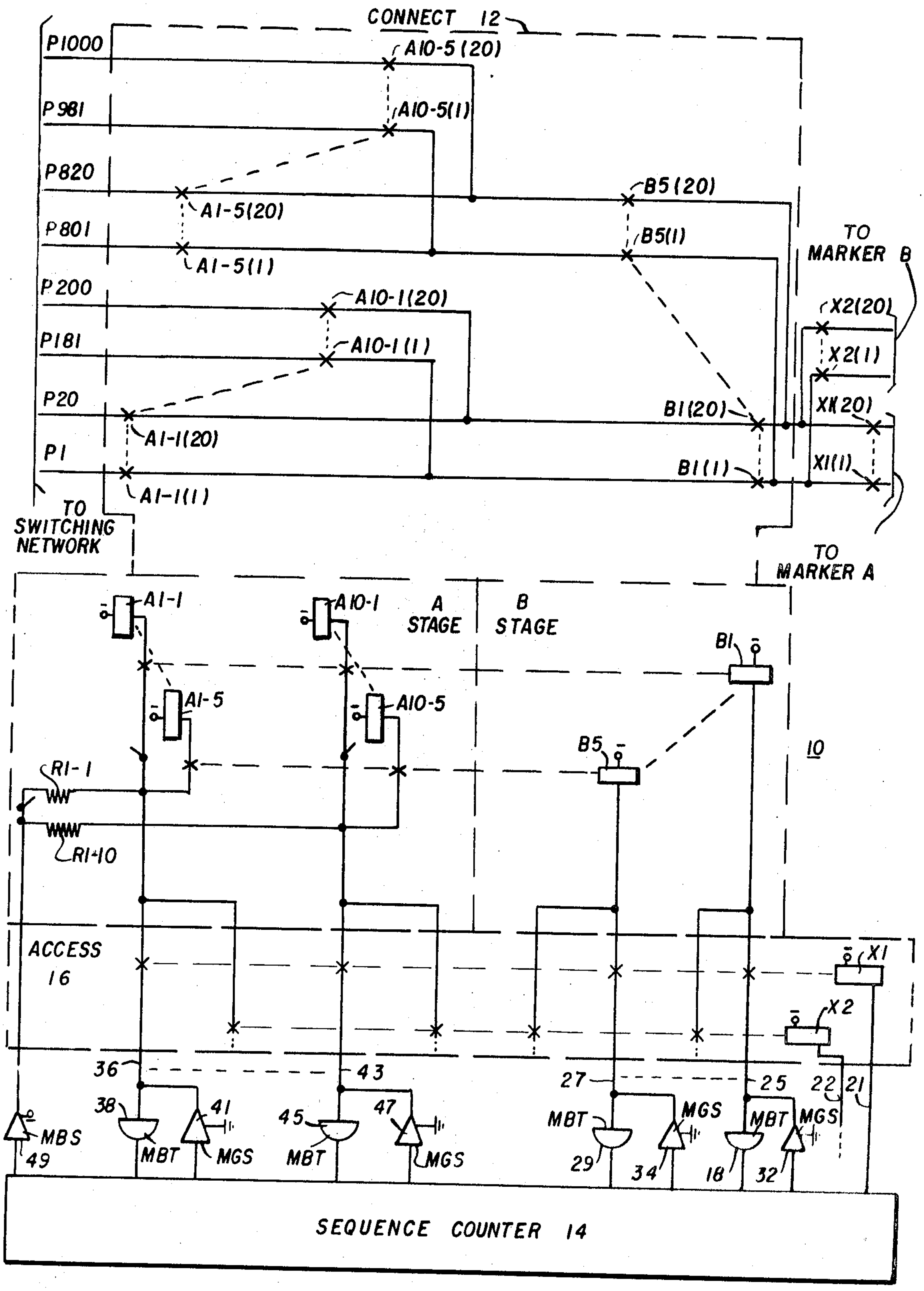
CONNECT 12
P1000
P981
P820
P801
P200
P181
P20
P1
A10-5(20)
A10-5(1)
A1-5(20)
A1-5(1)
B5(20)
B5(1)
A10-1(20)
A10-1(1)
A1-1(20)
A1-1(1)
B1(20)
B1(1)
TO MARKER B
X2(20)
X2(1)
X1(20)
X1(1)
TO SWITCHING NETWORK
TO MARKER A
A1-1
A10-1
A STAGE
B STAGE
B1
A1-5
A10-5
B5
10
R1-1
R1-10
ACCESS 16
X1
X2
36
43
27
25
22
21
38
41
45
47
MBT
MGS
MBS
49
29
34
18
32
SEQUENCE COUNTER 14

SELF-TESTING SELECTION ARRANGEMENT FOR A COMMUNICATION SWITCHING SYSTEM

BACKGROUND OF THE INVENTION

1. Field of the Invention

This invention relates to a self-testing selection arrangement, and it more particularly relates to a self-testing selection arrangement for a communication switching system having a switching network responsive to marker-generated control signals supplied over a series of control connections.

2. Description of the Prior Art

Selection apparatus in communication switching systems have been employed to select one conductor of a plurality or series of conductors. In this regard, in marker-controlled switching networks of communication switching systems, connection selection apparatus establish preselected ones of a series of control connections between the marker and its switching network for supplying control signals from the marker to the switching network to establish paths therethrough. Examples of such arrangements are disclosed in U. S. Pat. No. 3,413,421 for "Apparatus to Select and Identify One of a Possible Plurality of Terminals Calling for Service in a Communication Switching System" by A. S. Cochran et al., and United States patent 3,480,735 for a "Communication Switching Marker Having Continuity Testing Arrangement" by D. A. Mnichowicz et al. Such systems oftentimes employ relay trees to serve as connection selection apparatus for the purpose of establishing control signal connections between a marker and a switching network. While such connection selection arrangements have been successfully employed, they have not been entirely satisfactory for some applications in that during a switching operation of one stage of the relay tree, the relay coils of the next stage of the relay tree are operated only after an undesirably long interval of time has elapsed to insure that the contacts in the next stage have completely closed and thus to avoid operating the relay coils of the next stage before or during the closure of the relay contacts of that stage. In this regard it is undesirable to energize the relay coils of the next stage before the contacts of the succeeding stage have completely closed to insure a long contact life, since relay contacts sustain a certain amount of damage when they are opened or closed while current is flowing through them. In order to insure that the next stage relay contacts are completely closed, the operation of the next stage is delayed by a predetermined time interval to allow for the worst-case operate-time characteristics of the relay and any contact bounce time. Thus it would be highly desirable to have a selection arrangement which operates and releases in a much faster period of time than prior selection arrangements and which tests itself to insure complete and successful operation at each step of establishing a control connection and also to insure the complete and successful operation of each step of releasing a selected connection.

SUMMARY OF THE INVENTION

Accordingly, it is an object of the present invention to provide a new and improved communication switching system self-testing selection arrangement, which insures proper and successful completion of each step in the operation of selecting a pre-determined conductor or connection and also which insures the proper and successful completion of each step of the release of such a preselected conductor or connection.

Another object of the present invention is to provide such a new and improved self-testing selection arrangement, which is fast and efficient in operation.

Briefly, the above and further objects are realized in accordance with the present invention by providing a self-testing selection arrangement which includes a sequence counter for controlling a connection selection apparatus, whereby during the selection of a control connection the selection apparatus responds to the sequence counter for generating a signal indicative of a selected set of connections, and test circuits respond to the signal for advancing the counter, which in turn causes the selection apparatus to establish a selected one of the control connections. During a subsequent release of the established connection, the counter causes the selection apparatus to release the connection, and in response thereto, the counter is advanced. The signal indicative of the selected set is de-activated in response to the last-mentioned advancing of the counter, whereby during both the establishment of a control connection and the releasing of it the counter is advanced only in response to the successful completion of each step of the operation and if any one step is not successfully completed due to malfunctioning of the equipment for any other reason, the counter is not advanced and a maintenance request for service is initiated. In the preferred embodiment of the present invention, the connection selection apparatus includes a relay tree, and since the sequence counter controls the step-by-step operation of the tree, one stage of the tree is energized and the relay contacts in the next stage are closed to generate a signal indicative of the selected set of connections before the next stage is energized. Thus, the relay contacts of the next stage must be completely closed before the signal is generated, so that the counter is not advanced unless and until the signal is present. According to the present invention, there is no need to wait for a predetermined time interval before energizing the next relay stage, but instead the next stage is immediately energized upon the completion of operation of the preceding stage, whereby the operation of establishing and releasing control connections is performed in a quick and efficient manner and the closure of all relay contacts and opening thereof are insured. Moreover, if a failure or malfunction occurs during any step of the operation, a service request is immediately generated and thus the problem can be remedied in a fast and efficient manner since the source of the problem is automatically localized.

BRIEF DESCRIPTION OF THE DRAWINGS

The invention, both as to its organization and method of operation, together with further objects and advantages thereof, will best be understood by reference to the following detailed description taken in connection with the accompanying sheet of drawings, which is a functional and schematic drawing of a communication switching system self-testing selection arrangement constructed in accordance with the present invention.

DESCRIPTION OF THE PREFERRED EMBODIMENT

Referring now to the drawings, there is shown a self-testing selection arrangement 10, which is adapted to be used in a communication switching system (not shown) for assisting in the selection of one of a series of 1,000 connections P1–P1000 through a connect circuit enclosed by the phantom lines 12 including an A stage and a B stage relay tree to enable one of a pair of originating markers A and B (not shown) of the system to supply control signals to the inlet of a crosspoint-matrix switching network (not shown) of the system for establishing and releasing paths therethrough. A similar type of self-correcting arrangement may be employed at the outlet of the switching network so that one of the markers can apply ground and battery potentials at selected ones of the inlets and outlets for establishing a path through the switching network. A communication switching system which may include the self-testing selection arrangement of the present invention is disclosed in United States patent application Ser. No. 201,851 filed Nov. 24, 1971 by S. E. Puccini for a DATA PROCESSOR WITH CYCLIC SEQUENTIAL ACCESS TO MULTIPLEXED LOGIC AND MEMORY now Patent Number 3,737,873. The arrangement 10 includes a sequence counter 14 which determines the sequence of the control-connection selecting operation and is supplied with sufficient information from the system for the purpose of determining selected connections to permit an available path to be established through the switching network and which controls the connect circuit 12 and an access circuit 16. A series of main battery test gates, such as the gate 18, monitor the steps of the operation of the relay tree 12 to cause the counter 14 to be advanced as hereinafter described in greater detail.

Referring now to the arrangement 10 in greater detail, the relay tree 12 comprises two stages, A and B. While two stages are shown and described, it is to be understood that any number of stages may be employed in accordance with the present invention. The access circuit 16 includes relay coils X1 and X2, which are energized by a pair of leads 21 or 22, respectively, from the sequence counter 14 for connecting marker A or marker B, respectively, to the switching network and for connecting the access circuit 16 to either sequence counter 14 of the marker A or a similar sequence counter (not shown) of the marker B. The relay coils X1 or X2 are energized by ground potential switched to the respective leads 21 or 22, which are energized by the sequence counter 14 of the marker A and a similar sequence counter (not shown) of the marker B, respectively.

The B stage of the relay tree 12 includes a group of five relay coils B1 through B5, each of which has 20 normally-open contacts for selecting five groups of 20 connections, only the first and last ones of the groups of relay coils being illustated in the drawings. The relay coils B1 through B5 are connected through either one of the contacts of the relay coils X1 or X2 to five leads, the first one of which being lead 25 and the last one of which being lead 27 to a series of five main battery test gates, the first of which is gate 18 and the last of which is gate 29 for detecting the negative battery potentials through the relay coils B1 through B5, whereby if all of the five main battery test gates 18 through 29 detect the presence of the negative battery potentials, then the sequence counter 14 (assuming that marker A is assigned to the call and thus relay X1 has operated) is advanced in response thereto indicating that the contacts of the relay coil X1 have closed. Thereafter, in a subsequent sequence state of the counter 14, a preselected one of five main battery switch relay drivers connect ground to the selected one of the leads, such as the lead 25, for operating the corresponding relay coil, such as the relay coil B1, the first main ground switch connected to the lead 25 being switch 32 and the last one of the five main ground relay drivers having its output connected to the lead 27 is switch 34. The main battery test gates designated MBT shown in the drawings are circuits when when ground is applied to its input or its input is open circuited, supplies a true signal at its output, but when a negative battery potential is supplied thereto, a false indication is generated at its output. The main ground switch relay drivers illustrated in the drawings and designated MGS are electronic switches to operate relays, and they may comprise two transistors connected so that when a true signal is supplied at the input, ground potential from the main battery is connected via the emitter-collector path of the output state in saturation to a relay. The main battery switches shown in the drawings and designated MBS are electronic switches which are similar to the main ground switches except that the MBS circuits switch negative battery potential instead of ground potential.

The A stage of the relay tree 12 includes a first group of five relay coils A1-1 through A1-5, each of which has 20 relay contacts for completing 20 connections, such as connections P1–P20, through the connect circuit 12. The first group of relay coils A1-1 through A1-5 are connected together through contacts of the relay coil X1 to a lead 36, which is the first one of ten leads, and which in turn is connected through a main battery test gate 38 to the sequence counter 14. Also the relay coils A1-1 through A1-5 are connected together through contacts of the relay coil X2 to a similar arrangement in the marker B. A main ground switch 41 energized selectively by the sequence counter 14 has its output connected to the lead 36 in a manner similar to the main battery test gates and the main ground switches for the B stage. Similarly, a last group of five relay coils A10-1 through A10-5 are connected through contacts of the X1 or X2 relay coils, the connection through the X1 relay contacts being to the last lead 43 of the set of ten leads, a main battery test gate 45 having its input connected to the lead 43 and its output being connected to the sequence counter 14 of the marker A with the output of a main ground switch 47 being connected to the lead 43 and being energized by the sequence counter 14. There are also eight intermediate groups of relay coils (not shown) each having five relay coils of the A stage and are similarly connected through contacts (not shown) of the relay coils X1 or X2 to main battery test gates (not shown) and main ground switches (not shown) in a manner similar to the first and last groups of relay coils. Each one of the coils of each group of five coils of the A stage are connected through a separate one of the contacts of the five B stage coils B1 through B5 so that when one of the relay coils B1 through B5 is energized, a single one of the relay coils of each group of the A stage is connected then to one of the ten leads, such as the lead 36, whereby after the test gates detect the presence of the negative battery potential via the relay coils the selected one of the main ground switches connects ground potential to the lead to operate a single one of the A stage relay coils, which in turn completes 20 selected connections, such as the connections P1–P20, through the connect circuit 12. Thereafter, the marker selects one of the 20 connections to connect a potential to a selected inlet of the switching matrix of the switching network.

During a connection release operation, the main ground switch holding the preselected one of the A stage relay coils energized disconnects the ground potential for de-energizing the relay coil. Thereafter, the battery potential is then detected by the main battery test gate associated with the selected lead to determine that the corresponding main ground switch has in fact removed its ground potential and thus the main battery test gate advances the sequence counter 14. In response thereto, the sequence counter 14 causes the energized main ground switch to remove its ground potential from the selected one of the ten leads of the B stage, thereby releasing the energized B stage relay and thus to open its contacts in the A stage relay. Thereafter, the main battery test gate may detect, if desired, the open circuit, and then causes the sequence counter 14 to advance. In order to determine that the B relay contacts have opened, the counter 14 then energizes main battery switches 49 for connecting negative battery potential through one of a set of 10 parallel connected resistors R1-1 through R1–R10 to the selected lead and then to the main battery test gate. In response thereto the selected main battery test gate causes the sequence counter 14 to advance and thereafter the selected main battery switch is de-energized, and the B stage and the access circuit 16 are tested and released as hereinafter described in greater detail. The X relay is now released and when its contacts open all of the MBT gates detect an open condition to verify that all contacts have properly released, whereby the MBS circuit 49 can be de-energized.

Operation

Considering now a typical operation, assuming that the marker A is to establish a path through the switching network and that the sequence counter 14 has determined from other information from the system that of this particular group of 1,000 inlets the first 20 connections P1–P20 are to be selected and connected through the connect circuits 12, the sequence counter 14 first energizes the relay coil X1 of the access circuit 16 via the lead 21. Thereafter, the relay coil X1 closes its contacts in both the B and A stages and its 20 contacts X1(1) through X1(20) to the marker A. As a result a group-indicating signal in the form of negative potential is connected through the five relay coils B1 through B5 of the B stage to the five B stage leads, such as the lead 25, to the five test gates, such as the main battery test gate 18. The five test gates than causes the sequence counter 14 to advance to its next sequence state, thereby indicating that all of the contacts of the X1 relay have closed to connect the battery potentials through the first group of B relays to the test gates. After the sequence counter 14 advances, it energizes the main ground switch 32 which in turn connects ground potential to the lead 25 for energizing the relay coil B1. As a result, the relay coil B1 closes its contacts for the first relay in each of the ten groups of relays in the A stage and its contacts in 20 of the connections, including the connection P1. As a result, negative battery potential is connected through the selected ten relay coils, such as the relay coil A1-1, through the contacts of the relay coil B1 and the contacts of the relay coil X1, to the ten leads, such as the lead 36, for energizing the ten main battery test gates, such as the test gate 38. If at least one of the test gates is thus energized, the sequence counter 14 is advanced to its next sequence state. Thereafter, the sequence counter 14 energizes the main ground switch 41 for supplying ground potential to the lead 36 for energizing the relay coil A1-1 through the contacts of the relay coils B1 and X1. The relay coil A1-1 then operates and closes its contacts A1-1(1) through A1-1(20) to complete the connections P1–P20 through the connect circuit 12 between the marker and the switching network to permit the marker A to connect a potential to a selected one of the connections P1–P20, whereby a path may be established through the switching network.

Once it has been determined that the established connection is to be released, MGS 41 is de-energized by sequence counter 14, which in turn disconnects ground potential from the lead 36 to cause the relay coil A1-1 to be de-energized. The main battery test gate 38 detects the netative potential from the coil A1-1 to cause the sequence counter 14 to advance to its next sequence state, thereby indicating that the main ground switch 41 is de-energized properly. As a result, the contacts A1-1(1) through A1-1(20) of the relay coil A1-1 open to release the connections through the connect circuit 12. The presence of the negative battery potential also indicates that the MGS has turned off and that inductive current through the relay coil A1-1 has decayed so that no current is flowing through the contacts of the relay B1. Thereafter, the counter 14 de-energizes the main ground switch 32 for removing its ground potential from the lead 25, whereby the relay coil B1 becomes de-energized. As a result, the contact switches of the coil B1 open. Thereafter, the main battery test gate 38 detects the open circuit condition and the gate 18 detects the negative potential via the coil B1, whereby the sequence counter 14 advances accordingly. In response thereto, the sequence counter 14 causes the switch 49 to connect battery potential through the current-limiting resistor R1 (the resistors R1–R10 having substantially higher resistance than the resistance of any one of the relay coils) to the lead 36, whereby the gate 38 response thereto to cause the counter 14 to advance thereby to indicate that the B relay contacts have opened and the X1 relay contacts have remained closed. Thereafter, the sequence counter 14 de-energizes the relay coil X1 to return the self-testing arrangement 10 to its initial operating condition. Therefore, MBT 38 should detect an open circuit condition. The MBS 49 is de-energized by sequence counter 14.

It should be noted that the main battery test gates introduce a propagation time delay of about 0.8 $\mu$ seconds and the main ground switches introduce a time delay of about 30 to 50 $\mu$ seconds. However, such a delay is far less than a 5 or 6 millisecond predetermined time delay as in prior selection arrangements. Moreover, the gate and switch delays provide sufficient time for any contact bounce to cease.

What is claimed is:

1. In a communication switching system having a switching network and marker means for establishing and releasing paths through the switching network by supplying selectively control signals thereto, a plurality of control connections between the network and said marker means being established by a selection arrangement, said arrangement comprising: connection selection apparatus for controlling the establishment of the control signal connections; sequencing means for controlling said connection selection apparatus; said apparatus including set selecting means responsive to said sequencing means for generating a set signal indicative of a selected set of said plurality of control connections; testing means responsive to said signal indicative of said selected set of said control signals for advancing said sequencing means; said apparatus including control connection completing means responsive to said sequencing means being advanced and to said set selecting means for establishing a selected one of said control connections; said control connection completing means being responsive subsequently to said sequencing means for releasing said selected connection; said testing means being responsive to the releasing of said selected connection for advancing said sequencing means; and said set selecting means being responsive to the last-mentioned advancing of said sequencing means for causing said set selecting means to de-activate said signal indicative of a selected set.

2. In a communication switching system, said arrangement according to claim 1, wherein said control connection completing means includes group selecting means responsive to said sequencing means being advanced and to said set selecting means for generating a group signal indicative of a group of connections within said selected set of said control connections, said testing means being responsive to said group signal for advancing said sequencing means.

3. In a communication switching system, said arrangement according to clain 1, wherein said connection selection apparatus comprises a relay tree having a plurality of relay coils operatively associated with relay contacts.

4. In a communication switching system, said arrangement according to claim 3, wherein said set signal is a first potential connected through selected closed ones of said relay contacts and through relay coils.

5. In a communication switching system, said arrangement according to claim 4, wherein said testing means includes test gates responsive to said first potential for causing said sequencing means to advance.

6. In a communication switching system, said arrangement according to claim 5, wherein said testing means further includes switching means responsive to said sequencing means for connecting a reference potential to selected ones of said relay coils for energizing them.

7. In a communication switching system, said arrangement according to claim 6, wherein said set selecting means comprises a first stage of said relay tree and includes a plurality of relay coils coupled to outputs of said switching means and having contacts in a second stage of said relay tree.

8. In a communication switching system, said arrangement according to claim 7 wherein said control connection completing means includes group selecting means responsive to said sequencing means being advanced and to said set selecting means for generating a group signal indicative of a set of connections within said selected set of said control connections, said testing means being responsive to said group signal for advancing said sequencing means.

9. In a communication switching system, said arrangement according to claim 8, wherein said group selecting means includes said second stage of said relay tree, said second stage including a plurality of relay coils coupled to outputs of said switching means and having contacts for completing said connections.

10. In a communication switching system, said arrangement according to claim 8, wherein said testing means includes switching means responsive to said sequencing means for connecting selectively said first potential to said contacts of said relay coils of said first stage for testing purposes.

11. In a communication switching system, said arrangement according to claim 1, wherein said marker means includes first and second markers, further including access means for connecting selectively said connections to said first marker or to said second marker, said sequencing means including first and second sequence counters, said access means for connecting selectively said connection selection apparatus to said first sequence counter or to said second sequence counter.

* * * * *